March 4, 1958 J. G. SPERLING 2,825,813

TEMPERATURE-COMPENSATED TRANSISTOR OSCILLATOR CIRCUIT

Filed July 12, 1955

J.G. SPERLING
INVENTOR.

BY Darby & Darby
ATT'YS

United States Patent Office 2,825,813

Patented Mar. 4, 1958

2,825,813

TEMPERATURE-COMPENSATED TRANSISTOR OSCILLATOR CIRCUIT

Jacob G. Sperling, Great Neck, N. Y., assignor to Emerson Radio & Phonograph Corporation, Jersey City, N. J., a corporation of New York Application July 12, 1955, Serial No. 521,438

6 Claims. (Cl. 250—36)

The present invention is directed towards improvements in electrical oscillators and more particularly to an electrical oscillator utilizing a transistor and having improved temperature-compensation characteristics.

One of the disadvantages which has accompanied the use of transistors for general use is that they have a tendency to be excessively temperature-responsive. In the case of oscillators, this temperature sensitivity results in excessive fluctuation of output amplitude and frequency to such an extent that under some conditions of use the oscillator may go completely out of oscillation.

It is accordingly an object of the present invention to provide an improved transistor oscillator circuit which avoids the excessive temperature instability heretofore encountered. This is accomplished according to the present invention by providing a transistor oscillator of the feedback type, where the feedback is automatically varied during temperature changes to compensate for inherent instability of the transistor circuit.

Figure 1:
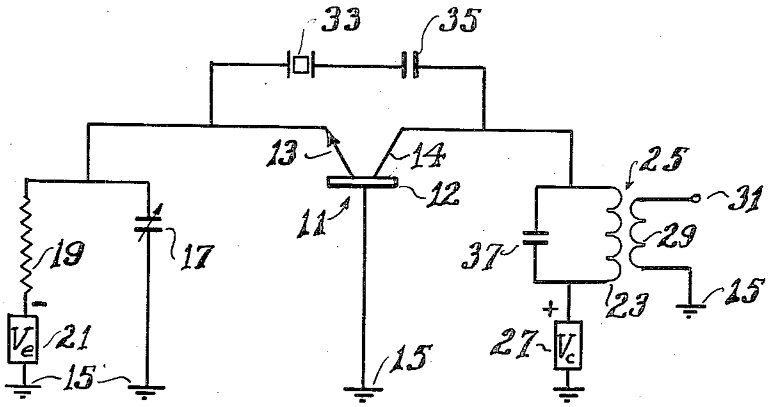

Other objects and advantages of the present invention will become more fully apparent from consideration of the following description of preferred embodiments thereof taken in conjunction with the appended drawings in which Fig. 1 shows a schematic diagram of one form of the present invention.

Figure 2:
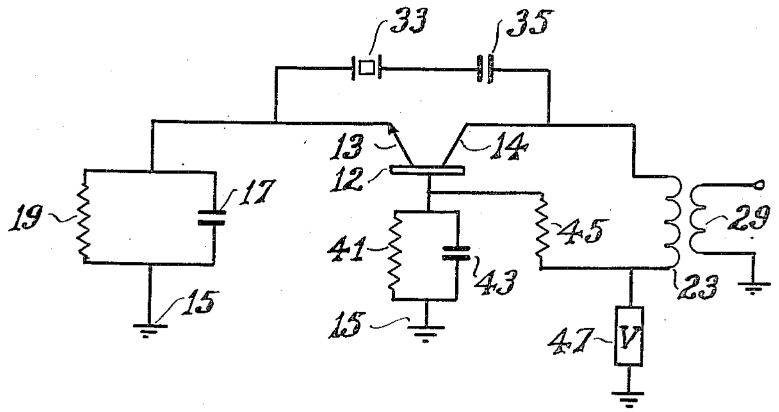

Fig. 2 shows a schematic circuit diagram of a modified form of the invention suitable for use with a single potential source.

Referring to Fig. 1, there is shown a transistor 11 having a base electrode 12, an emitter electrode 13 and a collector electrode 14. The outwardly pointing arrowhead on the symbol for the emitter 13 indicates that this transistor is of the NPN junction type although it may be of the PNP type or known modifications of these types.

As seen in Fig. 1, the base 12 is connected directly to ground 15. The emitter 13 is connected to ground 15 through a condenser 17 indicated as variable or adjustable, although during normal operation it is set to a fixed value of capacitance. The emitter 13 is also connected through a resistor 19 to a potential supply source 21 serving as a source of emitter bias voltage $V_e$. The other terminal of source 21 is connected to ground 15. The collector 14 is connected to one terminal of the primary 23 of a transformer 25 whose other terminal is connected to a potential supply source 27 acting as a source of collector bias $V_c$. The other terminal of source 27 is grounded at 15. The secondary 29 of the transformer 25 is connected to an output terminal 31 between which and ground 15 the output oscillations of the present circuit are derived.

Being of the junction type, the transistor 11 has a current gain $\alpha$ of less than unity, and when in the grounded base arrangement illustrated, the emitter and collector currents are in phase so that no oscillations will occur in the circuit in the absence of further circuit elements. For the purpose of permitting such oscillations to occur, a piezo-electric crystal 33 is connected in series with a D. C. blocking condenser 35 between the collector 14 and the emitter 13. A feedback circuit is then provided essentially by crystal 33 and condenser 17. The crystal 33 is operated in its series-resonant mode to provide a minimum impedance at the desired frequency of oscillation. The crystal 33 and condenser 17 essentially form a voltage divided series circuit, the portion of the total voltage impressed across this series circuit which appears across the condenser 17 being applied between the emitter 13 and grounded base 12. It will thus be apparent that the degree of feedback and magnitude of signal feedback are determined essentially by the condenser 17. Preferably the circuit is so designed that in the absence of the condenser 17 there will be insufficient feedback for regenerative oscillation purposes. The condenser 17 is then adjusted or selected to provide maximum amplitude of oscillation.

A further condenser 37 is connected across the transformer primary 23 to tune primary 23 and cause it to have a high Q while presenting but a small D. C. resistive load to the transistor 11, to thereby increase the effective voltage on the collector 14. The high Q circuit tends to suppress the harmonic content of the oscillator output and increases the R. F. output voltage. The condenser 37 may be omitted where the inherent or natural capacitance of the primary 23 is sufficient to resonate the primary 23 to the crystal frequency.

It will be understood that outside of the resonance region of the crystal, its impedance increases drastically, and insufficient feedback voltage is supplied to the emitter circuit to sustain oscillations, thereby confining oscillations of the oscillator substantially to the resonant frequency of the crystal. The capacitor 17 serves as a regeneration control, in shunt with the emitter input resistance 19 and completes the feedback path of the grounded base 15.

In operation, the circuit in the absence of the crystal is in a state of low conduction, due to the emitter circuit bias. When using an NPN transistor, the emitter bias $V_e$ is made negative and, for example, may have the value of −22 volts. The collector bias $V_c$ is in that case made positive and may be +22 volts. When the crystal 33 is inserted into the circuit, the feedback path is completed and the transistor 11 is thrown into a more conductive state, permitting oscillations to occur.

For a crystal operating at a frequency of 100 kilocycles per second and with an emitter resistance 19 of 15,000 ohms and condensers 17 and 35 of .01 microfarad, the circuit will provide an R. F. voltage of 24 volts peak-to-peak at room temperature.

In circuits of this type, with the grounded base configuration, the collector resistance decreases with temperature increase, but $\alpha$ remains relatively constant and the emitter resistance and the collector current with open circuit emitter also increase. The increase in emitter resistance and decrease in collector resistance would normally mean that the output amplitude would decrease with increase in temperature. However, the feedback capacitor 17 also serves as a temperature-compensating element, since with increase in temperature its fixed value of capacitive reactance in shunt with the increasing emitter resistance tends to increase its by-passing action. Accordingly, more and more feedback is introduced into the emitter circuit as the temperature rises, thereby compensating for the changes in emitter and collector resistance. With the circuit values previously indicated, quite uniform output amplitudes have been derived for temperature ranges up to 75° C.

While the foregoing circuit has been described as an

NPN transistor circuit, the same circuit may be utilized with a PNP transistor merely by reversing the indicated polarities of the emitter and collector biases.

Fig. 2 illustrates a variation in this circuit utilizing but a single bias source. In this instance the emitter resistor 19 and feedback control condenser 17 are connected in parallel, having their lower terminals grounded at 15. A biasing network comprising a resistor 41 and by-pass capacitor 43 is inserted between the base 12 and ground 15. A resistor 45 is connected between the base 12 and the biasing source 47 whose other terminal is grounded at 15. As will be seen resistors 45 and 41 provide a voltage divider across the source 47 so that a fixed bias is inserted between the emitter 13 and the base 12. The voltage drop across the resistor 45 essentially provides the collector bias $V_c$, while that across resistor 41 provides the emitter bias $V_e$. In one example, with the same circuit values already given, resistors 41 and 45 may have a value of 40,000 ohms, while the condenser 43 is .01 microfarad, using an NPN transistor and a source 47 of +22 or +45 volts. Exactly the same circuit of Fig. 2 may be utilized with a PNP transistor merely by reversing the polarity of this source 47. The operation of this circuit of Fig. 2 will be seen to be essentially the same as that of Fig. 1.

Accordingly, the present invention has provided a simple transistor oscillator circuit having good frequency stability provided by a piezo-electric crystal and having an amplitude stability with changing temperature provided by a regenerative control compensating for the normal effects of temperature variation.

It is to be understood that the foregoing description is intended to be illustrative only, and the invention is not to be considered limited thereto but to be defined solely by the appended claims.

What is claimed as the invention is:

1. A temperature-compensated oscillator circuit comprising a junction transistor having an emitter electrode, a collector electrode and a base electrode, an emitter impedance and a sourse of emitter bias connected between said emitter and said base, an output circuit coupled between said collector and said base and tuned substantially to the operating frequency of said circuit, a sourse of collector bias also coupled between said collector and said base, a series-resonant frequency element coupled between said collector and said emitter and tuned substantially to said operating frequency, and a regeneration-controlling condenser connected between said emitter and said base, said series-resonant element being insufficient in the absence of said condenser to provide sufficient regeneration for sustained oscillation in said circuit.

2. A temperature-compensated oscillator circuit comprising a junction transistor having an emitter electrode, a collector electrode and a base electrode, an emitter impedance and a source of emitter bias coupled between said emitter and said base, an output circuit tuned substantially to the operating frequency of said oscillator circuit and a source of collector bias coupled between said collector and said base, said emitter and collector bias sources being derived from the sections of a voltage divider coupled across a single bias supply source, a series-resonant frequency element coupled between said collector and said emitter and tuned substantially to said operating frequency, and a regeneration-controlling condenser coupled between said emitter and said base, said series-resonant element being insufficient in the absence of said condenser to provide sufficient regeneration for sustained oscillation in the circuit.

3. A transistor oscillator circuit comprising a junction transistor having base, collector and emitter electrodes, an input circuit coupled between said emitter and base electrodes and comprising an emitter resistance element shunted by a condenser and a source of emitter bias, an output circuit coupled between said collector and base and including a source of collector bias, and a regeneration circuit comprising a piezo-electric crystal series-resonant at the operating frequency of said circuit coupled between said collector and said emitter, whereby said crystal in association with said condenser provides a feedback circuit whose degree of regeneration is determined by the size of said condenser.

4. A transistor oscillator circuit comprising a transistor having base, collector and emitter electrodes, a source of emitter bias and an emitter circuit resistor coupled between said base and said emitter, an output circuit coupled between said base and said collector and including a source of collector bias, a series-resonant circuit coupled between said emitter and collector, and a regeneration-controlling temperature-compensating condenser coupled between said emitter and said base.

5. A circuit as in claim 4 wherein said series-resonant circuit in the absence of said condenser provides regeneration less than the amount necessary for sustained operation.

6. A circuit as in claim 4 wherein said output circuit is a high-Q low ohmic resistance circuit tuned substantially to the frequency of resonance of said series-resonant circuit.

References Cited in the file of this patent

FOREIGN PATENTS 916,072 Germany ______________ Aug. 2, 1954

OTHER REFERENCES

Article "Duality as a Guide in Transistor Circuit Design," by Wallace et al.; Bell System Technical Journal, vol. 30, pp. 381–417, April 1951.